April 22, 1969  H. L. SETZ  3,439,931
VEHICLE SUSPENSION SPRING
Filed April 25, 1966  Sheet 1 of 5
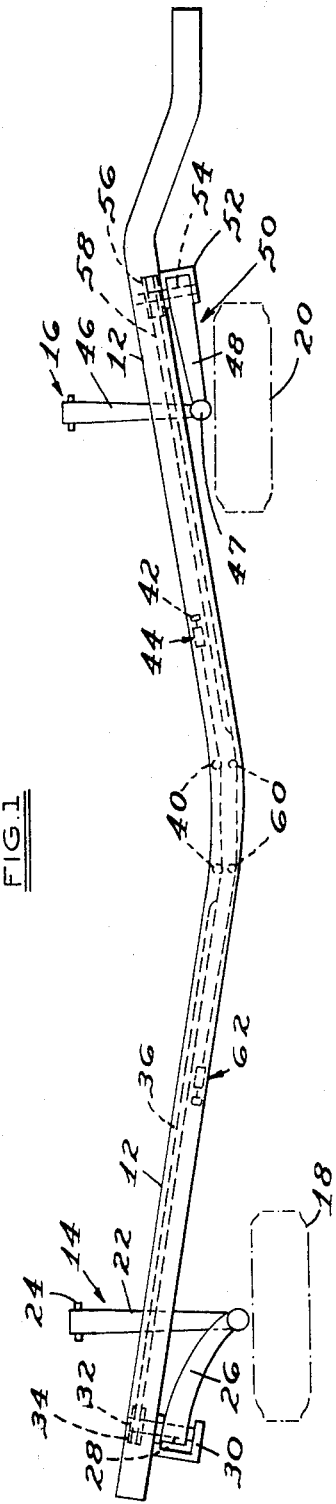
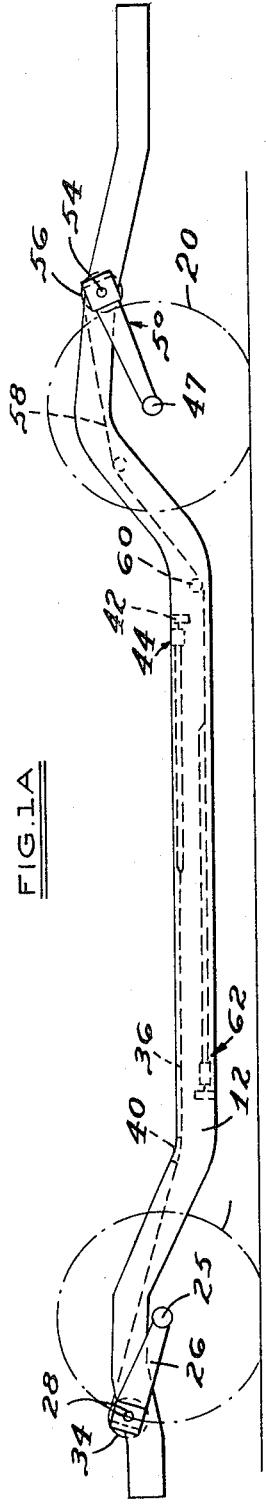
INVENTOR
HENRY L. SETZ
BY Robert E. McCollum
John R. Faulkner
ATTORNEYS

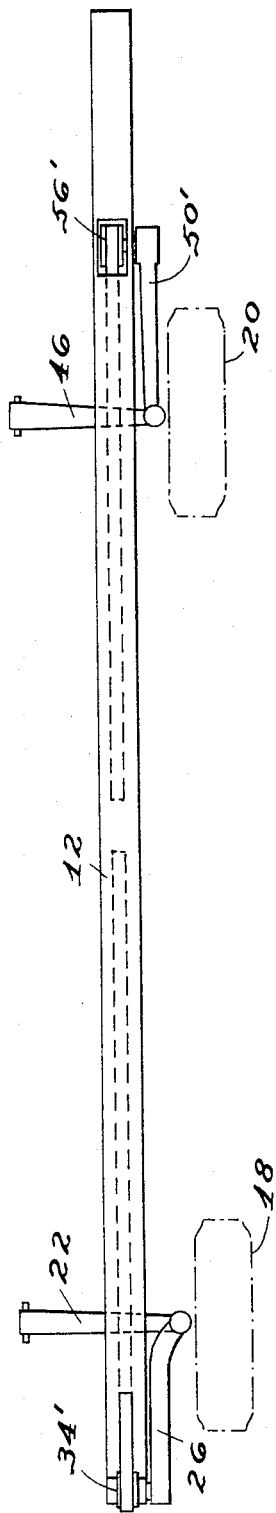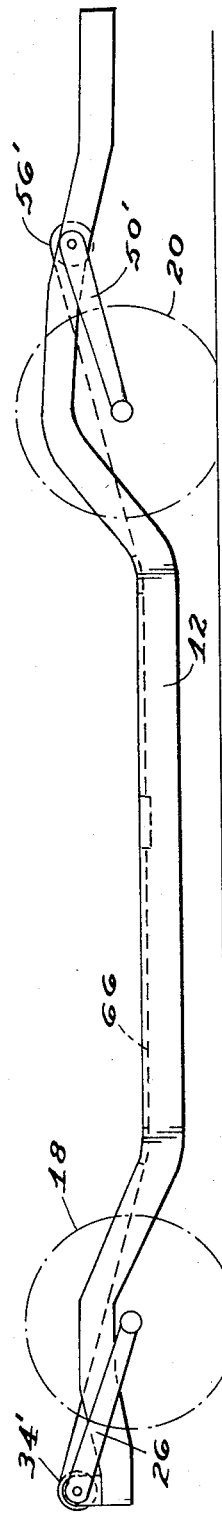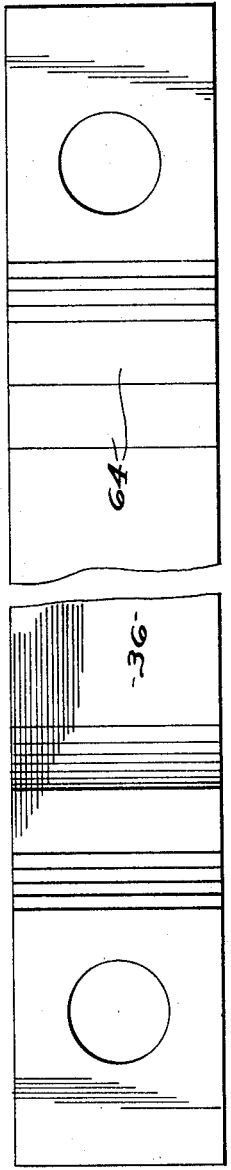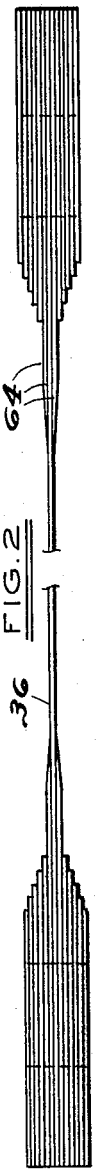

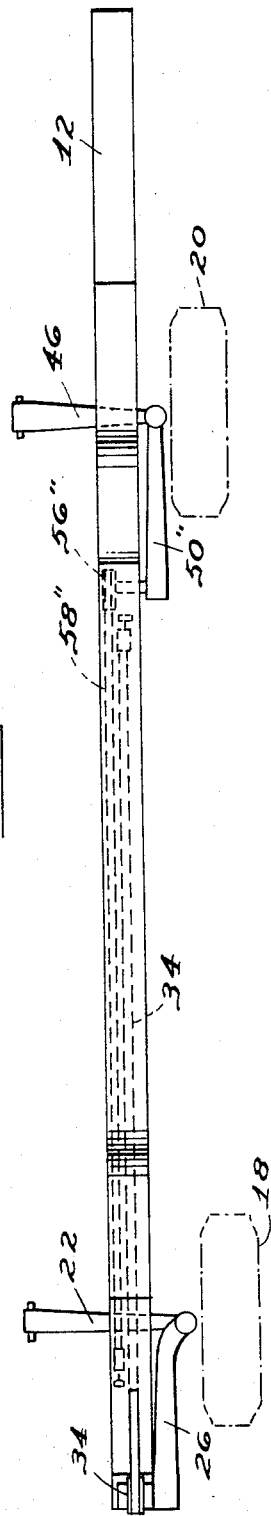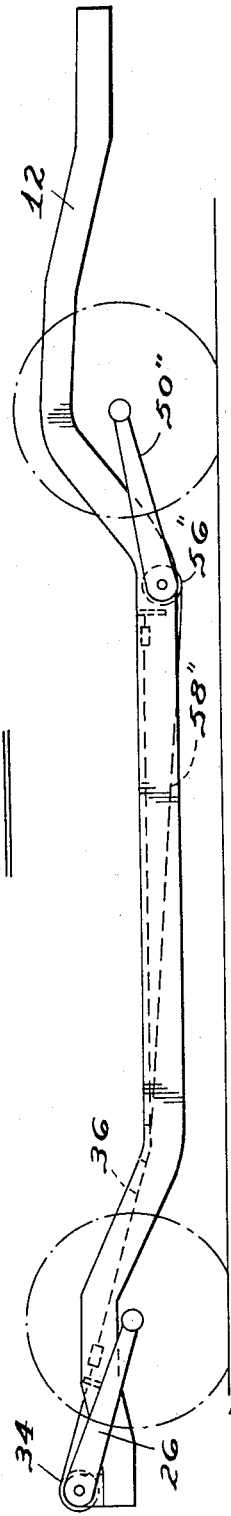

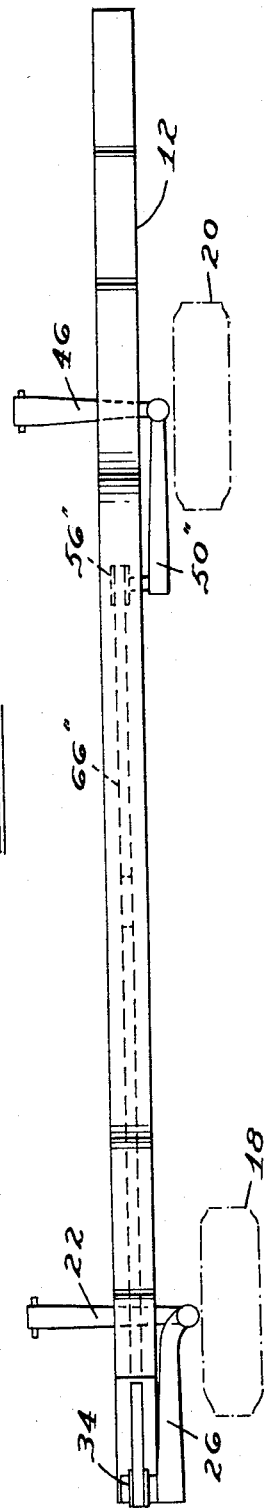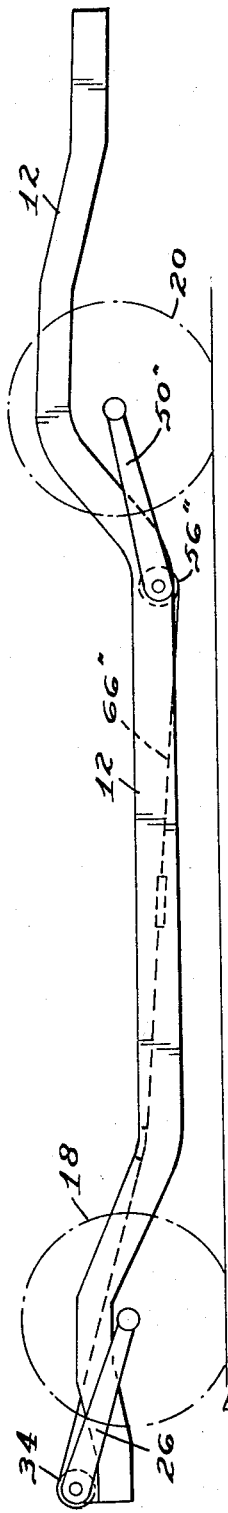

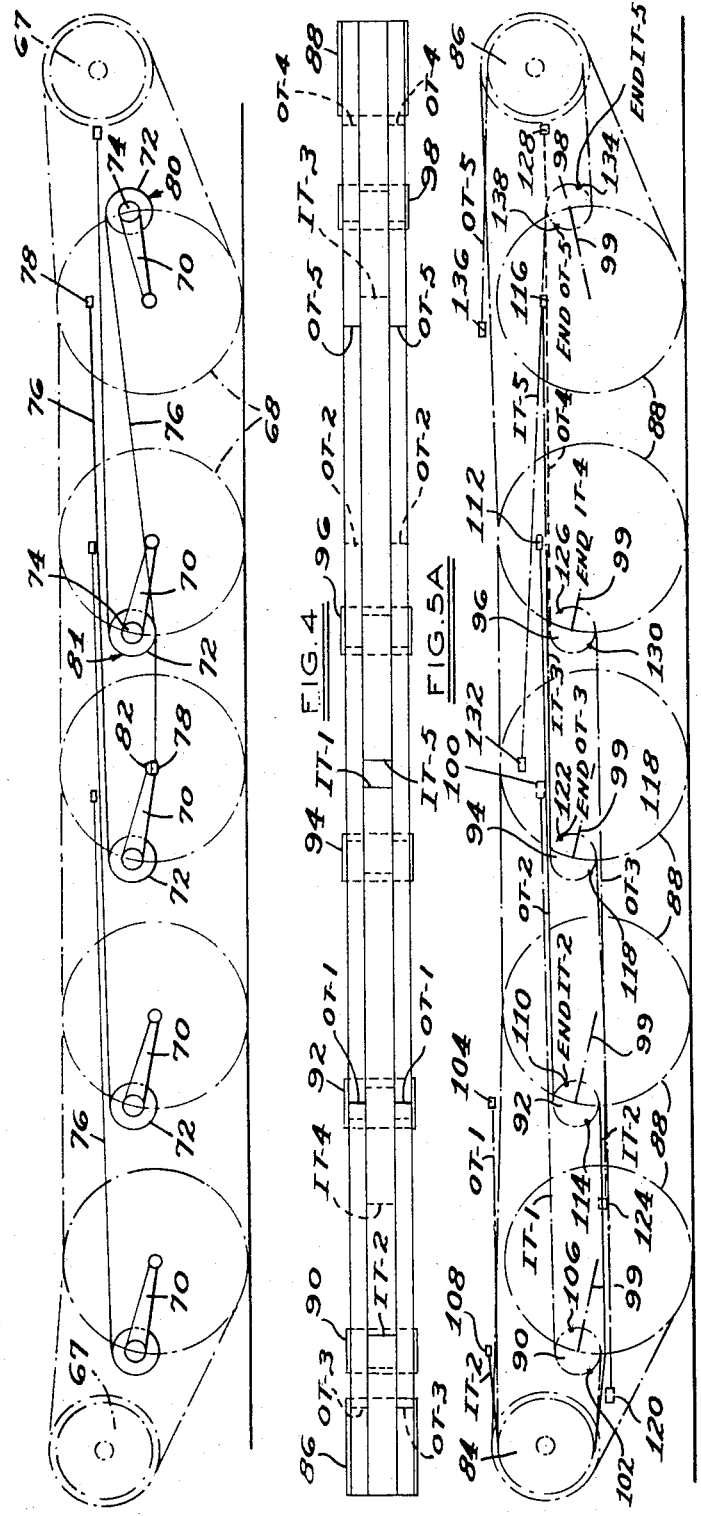

United States Patent Office 3,439,931
Patented Apr. 22, 1969

3,439,931
VEHICLE SUSPENSION SPRING
Henry L. Setz, Bloomfield Hills, Mich., assignor to Ford Motor Company, Dearborn, Mich., a corporation of Delaware
Filed Apr. 25, 1966, Ser. No. 545,045
Int. Cl. F16f; B60g
U.S. Cl. 280—124                                                18 Claims

ABSTRACT OF THE DISCLOSURE

A ribbon-like fiberglass tape is wound circumferentially around a drum that is rotatable upon arcuate movement of the leading or trailing arm of a motor vehicle suspension system to elastically support the sprung mass from the unsprung mass of the vehicle. Movement of the vehicle wheels in jounce is resisted elastically by a stretching of the fiberglass tape. One design provides independent operation of the front and rear suspensions; another provides a single tape interconnection between the two.

---

This invention relates, in general, to a mechanism for elastically supporting one member from another. More particularly, it relates to a motor vehicle type suspension system that eliminates the conventional coil or leaf spring between the axle assembly and vehicle frame.

One of the objects of the invention is to provide a vehicle suspension system that occupies relatively little space and therefore permits greater flexibility in the mounting and use of accessories and other components of a motor vehicle; is lighter in weight than a conventional suspension system, thereby improving the horsepower-to-weight ratio and increasing the fuel economy; and removes ride harshness and thereby provides superior riding characteristics.

Another object of the invention is to provide a vehicle suspension system consisting of an elastically stretchable spring in the form of a fiberglass-like tape that is operably connected between the axle assembly and frame to cushion movement of the axle assembly in jounce.

A further object of the invention is to provide a vehicle suspension system that is adaptable for use in vehicles having either leading or trailing arm type links for greater ride stability and a wider control of the operating characteristics of the vehicle.

A still further object of the invention is to provide a motor vehicle suspension consisting of a leading or trailing arm pivotally connected between the axle assembly and vehicle frame, the frame end of the arm having a drum secured to it for rotation upon relative movement between the axle assembly and frame, and a tension tape spring in the form of a ribbon secured around a peripheral portion of the drum and essentially anchored at its opposite end whereby movement of the axle assembly in jounce is resisted elastically in tension by the tape spring.

Other objects, features and advantages of the invention will become apparent upon reference to the succeeding, detailed description thereof, and to the drawings illustrating the preferred embodiments thereof; wherein:

FIGURE 1 shows, schematically, a plan view of a portion of a motor vehicle chassis embodying the invention;

FIGURE 1a is a side-elevational view of the FIGURE 1 showing;

FIGURES 1b and 1c show, respectively, a modification of the FIGURES 1 and 1a illustrations;

FIGURES 2 and 2a show, respectively, enlarged plan and side-elevational views of a detail shown in FIGURE 1;

FIGURES 3, 3a, 3b and 3c illustrate other modifications of the FIGURES 1, 1a, 1b and 1c showings; and, FIGURES 4, 5 and 5a show, schematically, views of a track type vehicle embodying a suspension constructed according to the invention.

FIGURE 1 illustrates, schematically, the suspension system for one side of a motor vehicle chassis 10. The chassis includes a channel type side rail frame member 12 that extends longitudinally from the front to the rear of the vehicle, and front and rear half axle assemblies 14 and 16. The details of construction of the full axle assemblies are not shown since they are conventional and are believed to be unnecessary for an understanding of the invention. Suffice it to say that the axles could be solid or one-piece, or a swing axle. In the case of a solid driving axle, the two drive shafts would be enclosed by a rigid housing fixed to a conventional differential. For swing axles, the drive shafts would be pivotally secured to the differential, which would be fixed on the frame. In either case, the drive shafts would be suitably secured to the wheels 18 or 20 in a known manner for vertical arcuate movement (FIGURE 1a) of the wheel and axle in jounce and rebound.

For the front axle assembly 14, the conventional steering mechanism (not shown) would, of course, be required, as well as the usual upper control arm for controlling the camber, caster and alignment of the front wheels. A cross member between the opposite side frame members generally would extend between side rails 12 (only one shown) for supporting the vehicle engine and transmission, and also for providing a fixed pivotal connection to the inner end of the axle assembly.

More specifically, FIGURE 1 shows, schematically, at the front end, a suspension lower control arm 22 pivotally secured at its inner end on a pivot axis 24 to a cross member (not shown) of the frame fixed to side rail 12. As stated previously, the upper arm and steering parts and other known details are not shown, for clarity. The lower control arm 22 has a universal connection 25 to wheel 18 for both a rotatable and pivotal movement in a known manner, and is pivotally secured at this point to the end of a trailing suspension arm 26. Arm 26 is inclined upwardly and forwardly, as best seen in FIGURE 1a.

The forward end of arm 26 is fixed to a pivot shaft 28 that extends substantially at right angles to arm 26. Shaft 28 is pivotally mounted at one end in a suitable bracket 30 welded or otherwise fixed to side rail 12. The opposite end of pivot shaft 28 is pivotally secured in side rail 12 at 32, and has a rotatable drum member 34 fixed on it. An elastically stretchable fiberglass tape spring 36 has one end wound counterclockwise circumferentially around and is bonded to a peripheral portion of drum 34. The tape is guided rearwardly through the channel of side rail 12 around suitable idler members 40 rotatably fixed to the rail, and is operatively anchored to the frame at 42 by an adjustable length anchor means 44.

The frame is suspended from the rear axle assembly 16 in a similar manner. Again, for clarity, only the suspension portion is shown. Rear axle shaft 46 has a universal connection 47 at its outer end to the rear wheel 20, and, if a solid axle, would be fixed at its inner end to a differential mechanism. If it is of the swing axle type, shaft 46 would have a pivotal connection at its inner end to a differential fixed to the frame.

The pivotal connection of shaft 46 to wheel 20 includes a pivotal connection to the forward end 48 of a leading arm 50. The arm 50 is pivotally attached to frame rail 12 on a suitable bracket 52, and is fixed to a pivot shaft 54. Like the front assembly, the shaft 54 is rotatably mounted in side rail 12, and has a drum 56 fixed on it. A fiberglass tape 58 is wound clockwise circumferentially around and is bonded to a peripheral portion of the drum, and extends forwardly through the channel of side rail 12 around idlers 60 secured to the frame. The tape 58 is suitably anchored to side rail 12 by adjustable tension anchor means 62.

As best seen in FIGURES 2 and 2a, the spring tape 36 (and 58) consists of a multiplicity of longitudinally extending, ribbon-like glass filaments 64 that are bonded together by a suitable resin to form a flat tape having a width considerably greater than its thickness. The end portions of the tape are built up, as shown, to provide thickness and strength for the end anchor connections. The glass filaments have exceptional elastic stretching capacity when subjected to a tensile load in a lengthening direction, and are capable of storing considerable energy, in a manner described in U.S. 2,812,936. For example, the glass filaments will stretch up to four times that of an equivalent steel filament, as described in the above-mentioned patent.

In operation, the fiberglass tapes 36 and 58 initially are installed under tension sufficient to support the frame or side rails 12 from axle assemblies 14 and 16 at the desired height from the ground level, indicated in general in the position shown in FIGURE 1a. When either of the wheel assemblies encounters an obstacle and moves upwardly or vertically in jounce, the resultant arcuate swinging movement of front arm 26, for erample, rotates pivot shaft 28 and drum 34 and attempts to wind up spring tape 36. This wind-up is resisted elastically by tensioning of the tape, and therefore resists the jounce movement. Rebound movement of the wheel assembly, of course, will rotate drum 34 in the opposite direction and unload the tape. This is acceptable since generally it is only a momentary action, and if for more than a moment, will cause a corresponding lowering of the frame.

FIGURES 1 and 1a illustrate a suspension system in which the front and rear spring tapes are independently anchored to provide independent control of the front and rear wheel assembly jounce and rebound movements. FIGURES 1b and 1c show a single interconnected tape system in which movement of one of the wheel assemblies in jounce or rebound is resisted elastically by the other wheel assembly suspension, or a corresponding movement in rebound. In this latter case, the side rails 12 have been illustrated as being straight, instead of curved as in FIGURE 1a. However, it will be clear that they could be curved, if desired, without departing from the scope of the invention.

More specifically, as best seen in FIGURE 1c, the forward end of a single tape 66 is wound counterclockwise around the front drum 34', and clockwise over the rear drum 56', the intermediate portion of the tape being guided through the channel of rail 12. With this type of connection, movement of the front wheel assembly in jounce tends to rotate front drum 34' counterclockwise and lift the frame; this, however, is resisted by the attempt of the rear drum to load the rear wheel assembly into the ground with a resulting lift of the rear frame portion. A similar effect occurs during jounce movement of the rear wheel assembly when the front wheel assembly is at its normal heighth from the ground. The opposite effect occurs during rebound movement downwardly of either wheel. That is, downward movement of wheel 18, for example, will unwind the tape on drum 34' and permit a similar unwinding movement of rear drum 58', to maintain the frame level. Thus it will be seen that the independent system of FIGURES 1 and 1a can be interconnected as in FIGURES 1b and 1c to provide control of the movement of one wheel assembly by the other.

FIGURES 3 and 3a illustrate a modification of the independent tape systems of FIGURES 1 and 1a to conform to the case where trailing arms are provided at both the front and rear wheel assemblies. In this case, essentially the only difference over the FIGURES 1 and 1a showing is that the rear spring tape 58" is wound in a counterclockwise direction around the rear drum 56", or in the same direction as the tape 36 is wound around front drum 34. The operation, however, is essentially the same.

FIGURES 3b and 3c show the trailing arm rear wheel construction of FIGURES 3 and 3a adapted for a single or interconnected tape system similar to that described in connection with FIGURES 1b and 1c. In this case, the single tape 66" is wound around both drums 34 and 56" in a counterclockwise direction to provide the same action as described in connection with FIGURES 1b and 1c.

FIGURES 4 and 5 show, respectively, the independent and interconnected tension tape spring suspension systems applied to each side of a military track type vehicle, such as a tank. In FIGURES 4 and 5, the vehicle has two end idler rollers 67 and five driving wheels 68, each of which are movable independently through jounce and rebound in a manner similar to that described in connection with the wheels of the FIGURE 1 showing. Each of the wheel assemblies includes a leading or trailing arm 70 pivotally connected between the wheel assembly and frame, in the manner described in connection with FIGURE 1a. It also includes a rotatable drum 72 rotatably mounted on the frame and fixed for rotation with a pivot shaft 74 that is fixed to the frame end of arm 70. In FIGURE 4, individual tapes 76 are anchored at one end to a point 78 on the frame, and wound counterclockwise around and bonded to each drum 72, with the exception of the rearwardmost drum 80. The tape for drum 80 is wound clockwise around the drum, passes under drum 81, which is used as a guide roller, and is anchored to the frame, as shown.

FIGURE 5 shows the tank utilizing an interconnected tape system similar to FIGURES 1c and 3c; that is, in which the tapes between two wheels are interconnected. In this case, as best seen in FIGURE 5a, three tapes are used for each system, two tapes wound on the outer portions of the drum, and a third tape wound around the drum center peripheral portion. More specifically, the vehicle again has two end idler wheels 84 and 86, driving wheels 88, and five drums 90, 92, 94, 96 and 98 fixed to arms indicated schematically by the dotted lines 99.

The inside tape, I.T.–1, for front drum 90 is anchored to the frame at 100, and extends counterclockwise around and is bonded to drum 90 at 102. The two outside tapes for drum 90, O.T.–1, are anchored to the frame at 104, extend around idler 84 and counterclockwise around drum 90 to be bonded to it at 106.

Inside tape, I.T.–2, for the second driving wheel drum 92 is anchored to the frame at 108, extends around idler 84, under drum 90, and counterclockwise around drum 92 and bonded to it at 110. The two outside tapes for drum 92, O.T.–2, are anchored to the frame at 112, and extend counterclockwise around and are bonded to drum 92 at 114.

The single inside tape for drum 94, I.T.–3, is anchored to the frame at 116, extends forwardly over drum 96 and counterclockwise around drum 94, and is bonded to the latter drum at 118. The two outer tapes, O.T.–3, are anchored to a forward frame portion 120 adjacent idler 84, extend rearwardly under drums 90 and 92 and counterclockwise around drum 94, and are bonded to drum 94 at 122.

The single inside tape for drum 96, I.T.–4, is anchored to a forward portion of the frame at 124, extends rearwardly under drums 92 and 94, is wound counterclockwise around drum 96 and bonded to it at 126. The two drum 96 outside tapes, O.T.–4, are anchored to a frame portion 128 adjacent rear idler 86, extend forwardly over drum 98 and counterclockwise around drum 96, and are bonded to the latter drum at 130.

Finally, the single inside tape for drum 98, I.T.–5, is anchored to a mid-portion of the frame at 132, extends rearwardly and is wound clockwise around drum 98 and bonded to it at 134. The two drum 98 outside tapes, O.T.–5, are anchored to the frame at 136, extend around the idler 86, and are wound clockwise on the drum 98 and bonded to it at 138.

From the above, it will be seen that each of the tape drums has bonded to it the ends of three tapes at diametrically opposite portions; that is, two at one spot, and one diametrically opposite. The tensioning of one or more, during jounce of the associated wheel, will, therefore, be resisted by the remaining. It will also be seen that the tapes, therefore, are interconnected between pairs of wheels, in a manner similar to that already described in connection with the FIGURES 1c and 3c showings.

From the foregoing, it will be seen that the invention provides a simple vehicle suspension system that offers substantial weight savings over conventional suspension systems using coil or leaf springs; reduces the space requirements, and, therefore, allows greater design flexibility; and that the use of plastic bonded glass filaments as spring material forming a tension tape ribbon-like spring provides a more resilient ride than that offered by conventional systems.

While the invention has been illustrated in its preferred embodiments in the figures, it will be clear to those skilled in the arts to which the invention pertains that many changes and modifications may be made thereto without departing from the scope of the invention.

What is claimed is:

1. A motor vehicle having a wheel assembly movable in jounce and rebound, a vehicle frame, and means resisting relative movement between said assembly and frame in one direction, said means including elastically stretchable tape means between and operably connecting said frame and assembly, said first-mentioned means including drum means on one of said assembly and frame and rotatable upon relative movement therebetween, said tape means having one portion thereof secured to said drum for an elastic change in length of said tape means upon rotation of said drum, said first-mentioned means also including additional means pivotally interconnecting said assembly and frame, and means securing said drum to a portion of said additional means, said tape means having another portion operatively connected to said frame.

2. In a motor vehicle having a swingable arm pivotally connected between the vehicle frame and axle, a suspension mechanism comprising a drum secured for rotation with the frame end of said arm upon swinging thereof, and a stretchable elastic tape wrapped around and secured to a portion of said drum and anchored to said frame to resist elastically rotation of said arm and drum in one direction.

3. In a motor vehicle having a separate swingable arm pivotally connecting each axle of a pair to the vehicle frame, a suspension mechanism comprising a drum secured to each of said arms adjacent the frame for rotation thereof upon movement of the associated axle in jounce, and elastically stretchable tape means wrapped around a portion of each of said drums for resisting elastically rotation of either drum during movement of either of said axles in jounce.

4. A suspension mechanism comprising first and second longitudinally extending members having intersecting longitudinal axes and each movable in planes substantially at right angles to each other, means pivotally connecting said members at their intersecting axes ends, the opposite end of said second member having essentially a fixed pivot axis, a rotatable drum fixed to said opposite end for rotation with said second member upon movement of said first member, and elastically stretchable tape means at one end wrapped around a portion of said drum and essentially anchored at its opposite end to resist elastically rotation of said second member in one direction.

5. A suspension for a motor vehicle comprising a sprung mass including a frame, an unsprung mass including a wheel and axle shaft movable through jounce and rebound, and means operatively connecting and supporting said frame from said axle, said means including a drum rotatably mounted on said frame, an arm secured to said drum and pivotally connected to said axle, and elastic spring means at one end wrapped around a circumferential portion of said drum and operatively anchored at its opposite end to said sprung mass to elastically resist rotation of said drum upon rotation of said arm during movement of said axle in jounce.

6. A suspension system as in claim 5, said spring means comprising a longitudinally extendable fiberglass tape.

7. A suspension system as in claim 6, said tape comprising a plurality of connected longitudinally extending glass fibers stretchable in tension.

8. A suspension system as in claim 5, said arm and spring means each extending in the general direction of said frame, said drum having an axis of rotation substantially at right angles to said arm, said arm having a pivot shaft pivotally secured to said frame and fixed to said drum coincident with the drum axis of rotation and extending in the general direction of said axle.

9. A suspension for a motor vehicle comprising a sprung mass including a longitudinally extending frame, an unsprung mass including front and rear laterally directed axles movable separably through jounce and rebound, and means operatively connecting and supporting said frame from said axles, said means including a drum rotatably mounted on said frame adjacent each axle, a longitudinally extending arm secured to each of said drums and each pivotally connected to its associated axle, and a pair of elastically stretchable spring means each operatively anchored at one end to said frame and having its opposite end wrapped around a circumferential portion of one of said drums to resist elastically rotation of either of said drums upon pivotal movement of its associated arm during movement of the associated axle in jounce.

10. A suspension as in claim 9, the front and rear arms being trailing and leading arms, respectively, the different drums having the said spring means wrapped therearound in opposite directions.

11. A suspension as in claim 9, the front and rear arms being trailing arms, each of said spring means being wrapped around said drums in the same direction.

12. A suspension as in claim 10, said spring means comprising a thin tape of longitudinally extending joined fiberglass threads stretchable in tension.

13. A suspension as in claim 11, said spring means comprising a thin tape of longitudinally extending joined fiberglass threads stretchable in tension.

14. A suspension for a motor vehicle comprising a sprung mass including a longitudinally extending frame, an unsprung mass including front and rear laterally directed axles movable separably through jounce and rebound, and means operatively connecting and supporting said frame from said axles, said means including a drum rotatably mounted on said frame adjacent each axle, a longitudinally extending arm secured to each of said drums and each pivotally connected to its associated axle, and elastically stretchable tape means opposite ends connecting said drum and having opposite ends wrapped around a circumferential portion of separate drums whereby rotation of either of said drums upon pivotal movement of its associated arm during movement of the associated axle in jounce is resisted elastically by said tape means and the non-rotation of said other drum.

15. A suspension as in claim 14, the front and rear arms being trailing and leading arms, respectively, said tape means being wrapped around said drums in opposite directions.

16. A suspension as in claim 14, the front and rear arms being trailing arms, said tape means being wrapped around said drums in the same direction.

17. A suspension as in claim 14, said tape means comprising a plurality of longitudinally extending glass fibers joined in a side-by-side arrangement and longitudinally elastic in tension.

18. A suspension system as in claim 14, said arms and tape means each extending in the general direction of said frame, each of said drums having an axis of rotation substantially at right angles to its arm, each arm having a pivot shaft pivotally secured to said frame and fixed to its drum coincident with the drum axis of rotation and extending in the general direction of said axles.

References Cited

UNITED STATES PATENTS

| 2,812,936 | 11/1957 | Setz | 267—1 |
| 1,544,927 | 7/1925 | Norton | 267—2 |
| 1,694,549 | 12/1928 | McNaught | 267—10 |

FOREIGN PATENTS

| 1,113,524 | 12/1955 | France. |

PHILIP GOODMAN, *Primary Examiner.*

U.S. Cl. X.R.

267—2